United States Patent [19]

Renne

[11] Patent Number: 5,076,077

[45] Date of Patent: Dec. 31, 1991

[54] LOCKING DEVICE FOR A GLAD HAND BRAKE LINE COUPLER

[76] Inventor: Donald G. Renne, 3048 Creekview Dr., Grapevine, Tex. 76051

[21] Appl. No.: 648,263

[22] Filed: Jan. 31, 1991

[51] Int. Cl.⁵ ............................................. E05B 73/00
[52] U.S. Cl. ........................................ 70/14; 70/232
[58] Field of Search ............... 70/14, 18, 57, 58, 232, 70/258

[56] References Cited

U.S. PATENT DOCUMENTS

| | | | |
|---|---|---|---|
| 2,571,349 | 10/1951 | Eckles | 70/14 |
| 2,785,564 | 3/1957 | Rossi | 70/232 |
| 3,605,457 | 9/1971 | Foster | 70/14 |
| 3,884,055 | 5/1975 | Vuillemot | 70/58 |
| 4,226,103 | 10/1980 | Strickland | 70/237 |
| 4,325,237 | 4/1982 | Menzie | 70/14 |
| 4,693,096 | 9/1987 | Mercer | 70/14 |
| 4,732,018 | 3/1988 | Crosby | 70/19 |
| 4,738,126 | 4/1988 | Haberle | 70/14 |
| 4,747,623 | 5/1988 | Necomb et al. | 285/69 |

Primary Examiner—Gary L. Smith
Assistant Examiner—Suzanne L. Dino
Attorney, Agent, or Firm—Henderson & Sturm

[57] ABSTRACT

An apparatus (10) for preventing the attachment of a glad hand brake line coupling device (100). The apparatus (10) includes a pivoted member (32) and a stationary member (31) equipped with a brake line plug (36) to be inserted into the brake line conduit (101). The stationary member (31) and pivoted member (32) may be locked together with the use of a conventional padlock (11) to prevent the coupling of the glad hand brake line coupling device (100).

6 Claims, 3 Drawing Sheets

LOCKING DEVICE FOR A GLAD HAND BRAKE LINE COUPLER

TECHNICAL FIELD

The present invention relates to the field of locking devices for glad hand brake line couplers, and in particular to releasable locking devices for glad hand brake line couplers that may be used in conjunction with conventional padlocks.

BACKGROUND ART

This invention was the subject matter of Document Disclosure Program Registration No. 255465 which was filed in the United States Patent and Trademark Office on June 14, 1990.

As can be seen by reference to the following U.S. Pat. Nos. 4,226,103; 4,325,237; 4738,126; and 4,747,623; the prior art is replete with myriad and diverse locking devices for glad hand brake line couplers.

While all of the aforementioned prior art constructions are more than adequate for the basic purpose and function for which they have been specifically designed, these prior art constructions are uniformly deficient in that they require the lock to be either an integral part of the device, or specifically designed for use with the device. In addition, should it become necessary to break the lock so that the device may be removed, the device must also be broken, or in the alternative, the glad hand brake lines or couplers must be severed.

As a consequence of the foregoing situation, there has existed a longstanding need for a new type of locking device for glad hand brake line couplers that may be releasably attached with a conventional pad lock. The provision of such a construction is a stated objective of the present invention.

DISCLOSURE OF THE INVENTION

Briefly stated, this invention comprises a locking device for a glad hand brake line coupler that utilizes a conventional pad lock to create the operative lock out of the coupler, thereby preventing the attachment of the complimentary glad hand coupler. The device is especially useful when a truck has been moved to the "deadline" for repair and accidental hookup to a tractor could be dangerous. In addition, since the air brakes of a trailer are fully engaged when the brake line coupler is disconnected, the device may be used to insure that a trailer is not moved during loading, unloading, or when left unattended.

As will be explained in greater detail further on in the specification, the apparatus may be used to operatively lock a glad hand brake line coupler, securing it from attachment to the mating glad hand brake line coupler.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
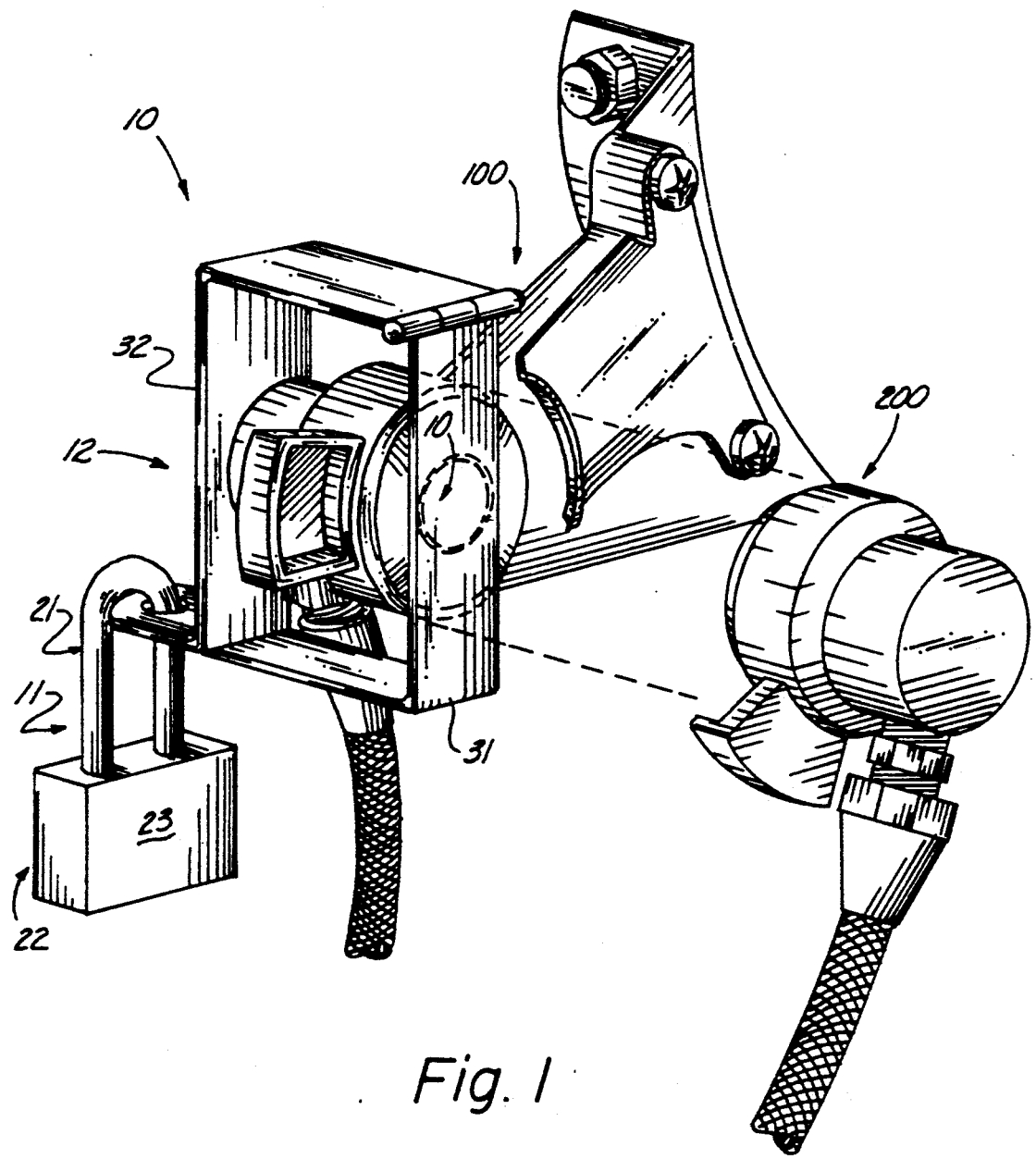
FIG. 1 is a perspective view of one version of the preferred embodiment of this invention disposed in its intended environment.
Figure 2:
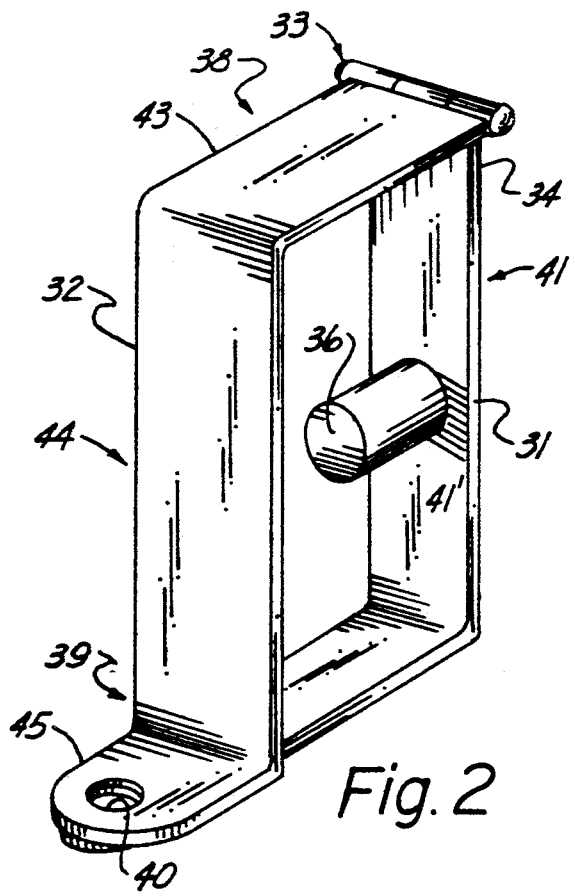
FIG. 2 is an isolated perspective view of the version depicted in FIG. 1.

As can be seen by reference to the drawings, and in particular to FIG. 1, the locking device for glad hand brake line couplers that forms the basis of the present invention is designated generally by the reference numeral (10).

The device (10) comprises in general, a padlock unit (11) and an enclosing unit (12). These units will now be described in seriatim fashion.

Figure 3:
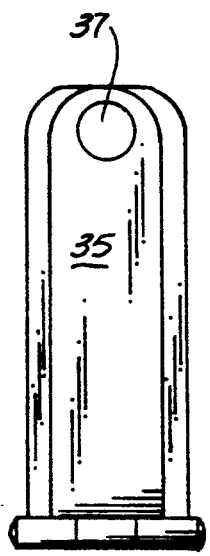
FIG. 3 is a bottom plan view of this first version.
Figure 4:
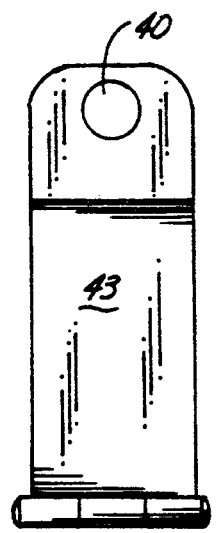
FIG. 4 is a top plan view.
Figure 5:
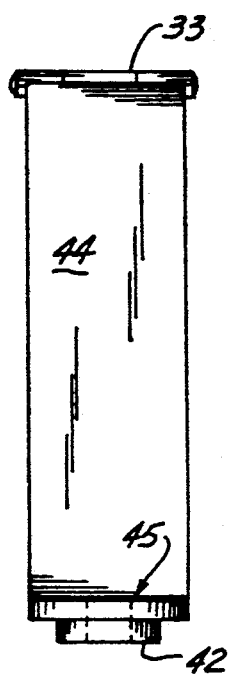
FIG. 5 is an end view as seen from the left side of FIG. 2.
Figure 6:
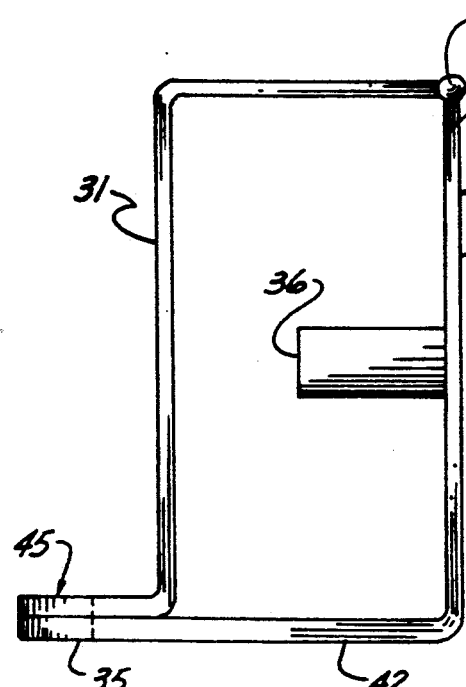
FIG. 6 is a side plan view.
Figure 7:
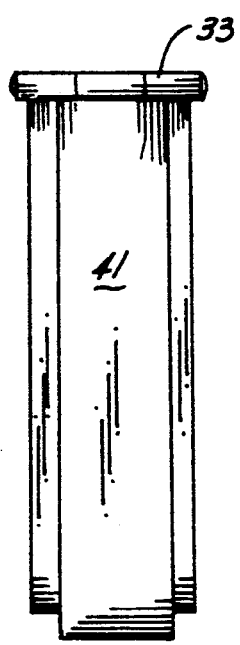
FIG. 7 is an end view as seen from the right side of FIG. 2.
Figure 8:
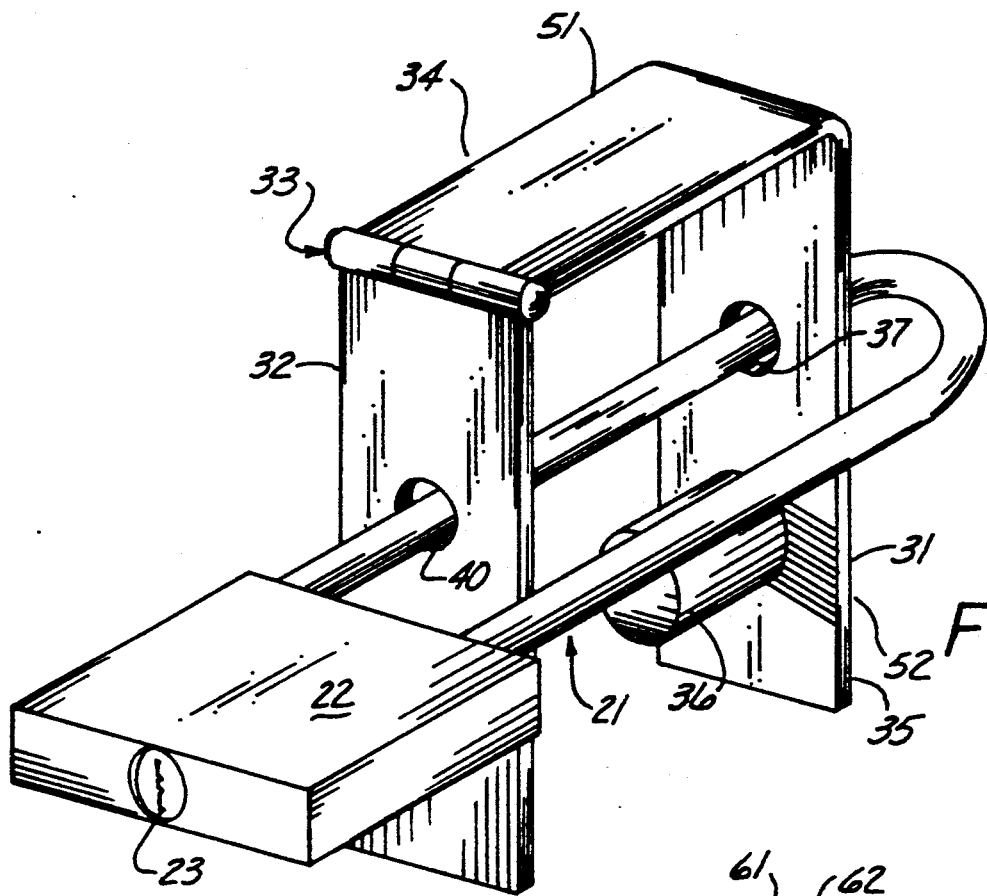
FIG. 8 is a perspective view of another version of the preferred embodiment.

As can best be seen by reference to FIGS. 1, 3, and 8, the padlock unit (11) comprises a generally U-shaped shank member (21) which may be of varied length to accommodate different embodiments of the invention, a housing member (22) which releasably secures the shank member (21) and an internal locking mechanism (23) which controls the locking and unlocking of the padlock unit (11), that is generally achieved by use of a key lock or combination lock.

Turning now to FIGS. 1-9, it can be seen that the enclosing unit (12) comprises in general, a stationary member (31) and a pivoted member (32) having a pivoted connection (33) operatively disposed between them. The stationary member (31) is provided with the pivoted connection at one end (34) wherein the other end (35) is provided with a brake line plug (36) and a first aperture (37).

The pivoted member (32) is captive at one end (38) at the pivoted connection (33) and free at the other end (39). The free end (39) has a second aperture (40) having a diameter equal to that of the first aperture (37) of the stationary member (31). It should also be noted that the construction is such that when the pivoted member (32) is adjusted to the operative position, the first (37) and second (40) apertures are aligned such that the shank (21) of the locking unit (11) may be placed through both apertures (37, 40), thereby enabling the operative securement of the enclosing unit (12).

In the first version of the preferred embodiment shown in FIGS. 1 through 4, the stationary member (31) of the enclosing unit (12) is generally L-shaped. The leg portion (41) is operatively secured at the pivoted connection (33) and brake line plug (36) is disposed on the inside (41') of the leg (41). The foot portion (42) further comprises a free end provided with a first aperture (37).

The pivoted member (32) in this version is generally S-shaped and is comprised of an upper horizontal element (43) which is operatively secured by the pivoted connection (33). An intermediate element (44) having a length approximately equal to that of the leg portion (41) of the stationary member (31) and a lower horizontal element (45) provided with a second aperture (40).

Turning to FIG. 1, the operation of the arrangement is shown. The enclosure unit (12) of the device (10) is positioned such that the brake line plug (36) is fitted within the brake line conduit (101) of the glad hand coupler (100). The pivoted member (32) is then adjusted so that the lower horizontal element (45) and the foot portion (47) of the stationary member (31) are disposed in close proximity to one another. The shank (21) of the padlock unit (11) is then placed through the first and second apertures (37, 40). Shank (21) is then locked in the conventional manner. This arrangement therefore disables the glad hand device (100) from coupling with its mating piece (200).

In the second version of the preferred embodiment shown in FIG. 8, the stationary member (31) of the enclosing unit (12) is generally L-shaped. The foot portion (51) is operatively secured at the pivoted connection (33) and the leg portion (52) is provided with a first aperture (37) and a brake line plug (36). The first aperture (37) is disposed intermediate the brake line plug (36) and the juncture of the foot (52) and leg (51) portion.

The pivoted member (32) of the enclosing unit (12) is generally straight and provided with a second aperture (40); wherein the upper end of the pivoted member (32) is operatively secured to the pivoted connection (33) and the second aperture (40) is disposed intermediate the pivoted connection (33) and the free end of the pivoted member (32).

This arrangement allows the device to be placed on a differently contoured glad hand coupler construction (100) from that shown in FIG. 1, but this version also requires that the shank (21) of the locking unit (11) be elongated in length to be fitted through both the first and second apertures (37, 40) as shown in FIG. 8.

Figure 9:
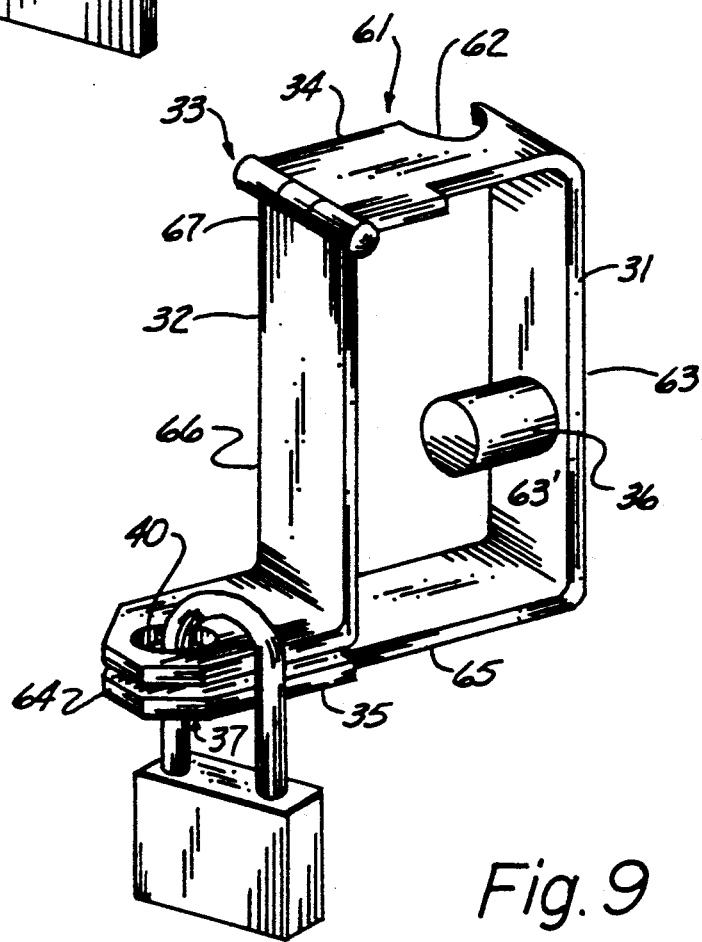
FIG. 9 is a perspective view of still another version of the preferred embodiment.

A third version of the preferred embodiment is shown in FIG. 9. The stationary member (31) is generally U-shaped and the upper portion (61) is operatively secured at the pivoted connection (33) and further provided with a recess (62) dimensioned to accommodate yet another common configuration of the glad hand coupler (100). The brake line plug (36) is disposed on the inside (63') of the intermediate portion (63) of the U shaped stationary member (31) and the aperture (37) is located near the free end (64) of the lower portion (65) of the stationary member (31). In addition, the pivoted member (32) is generally L-shaped. The leg portion (66) is operatively secured at one end (67) of the pivoted connection (33) and the foot portion (68) comprises an aperture (40). The apertures (37, 40) are aligned in the operative mode of disposition to accommodate the shank (21) of the padlock unit (11).

Having thereby described the subject matter of the present invention, it should be apparent that many substitutions, modifications and variations of the present invention are possible in light of the above teachings. It is therefore to be understood that the invention as taught and described herein is only to be limited to the extent of the breadth and scope of the appended claims.

I claim:

1. A locking device for brake line couplers for preventing the connection of the mating members of a glad hand brake line coupler to be used in conjunction with a conventional padlock having a generally U-shaped shank wherein the device comprises:

an enclosing unit including a stationary member having one end provided with a first aperture dimensioned to receive the shank of said padlock, wherein the stationary member is provided with a brake line plug for insertion into the brake line conduit of said glad hand brake line coupler; and a pivoted member having one end provided with a second aperture alignable with said first aperture and dimensioned to receive said shank, and, further provided with a pivoted connection between the other ends of said stationary member and said pivoted member; wherein said stationary member and said pivoted member cooperate to define a generally rectangular opening; and the brake line plug extends inwardly relative to said generally rectangular opening.

2. The device as in claim 1 wherein said stationary member is generally L-shaped.

3. The device as in claim 1 wherein said stationary member is generally U-shaped.

4. The device as in claim 1 wherein said stationary member is generally S-shaped.

5. The device as in claim 2 wherein said pivoted member is generally S-shaped.

6. The device as in claim 3 wherein said pivoted member is generally L-shaped.

* * * * *